(12) United States Patent
Zhang et al.

(10) Patent No.: US 11,757,616 B2
(45) Date of Patent: Sep. 12, 2023

(54) IMAGE ENCRYPTION METHOD BASED ON IMPROVED CLASS BOOSTING SCHEME

(71) Applicant: DALIAN UNVERSITY OF TECHNOLOGY, Dalian (CN)

(72) Inventors: Qiang Zhang, Dalian (CN); Pengfei Wang, Dalian (CN); Bin Wang, Dalian (CN); Haixiao Li, Dalian (CN); Rongrong Chen, Dalian (CN); Xiaopeng Wei, Dalian (CN)

(73) Assignee: DALIAN UNVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 17/877,994

(22) Filed: Jul. 31, 2022

(65) Prior Publication Data

US 2023/0092700 A1 Mar. 23, 2023

Related U.S. Application Data

(63) Continuation of application No. PCT/CN2022/097038, filed on Jun. 6, 2022.

(30) Foreign Application Priority Data

Sep. 18, 2021 (CN) .......................... 202111111709.5

(51) Int. Cl.
*H04L 9/00* (2022.01)
*H04L 9/06* (2006.01)

(52) U.S. Cl.
CPC ............ *H04L 9/001* (2013.01); *H04L 9/0618* (2013.01); *H04L 9/0643* (2013.01)

(58) Field of Classification Search
CPC ......... H04L 9/00; H04L 9/001; H04L 9/0618; H04L 9/0643
See application file for complete search history.

(56) References Cited

U.S. PATENT DOCUMENTS

| | | | |
|---|---|---|---|
| 7,486,794 B2* | 2/2009 | Pautot ................. | G06K 19/073 380/263 |
| 7,953,389 B2* | 5/2011 | Coleman ............... | H04W 12/12 455/67.11 |

(Continued)

FOREIGN PATENT DOCUMENTS

| | | |
|---|---|---|
| CN | 105488426 A | 4/2016 |
| CN | 110944096 A | 3/2020 |
| CN | 114338022 A | 4/2022 |

*Primary Examiner* — Hosuk Song
(74) *Attorney, Agent, or Firm* — Nitin Kaushik

(57) ABSTRACT

The present invention discloses an image encryption method based on an improved class boosting scheme, which comprises the following steps: acquiring parameters of a hyperchaotic system according to plaintext image information; generating weights required by class perceptron networks through the plain text image information; bringing the parameters into the hyperchaotic system to obtain chaotic sequences, and shuffling the chaotic sequences by a shuffling algorithm; pre-processing the chaotic sequences after shuffling to obtain a sequence required by encryption: and bringing a plaintext image and the sequence into an improved class boosting scheme to obtain a ciphertext image, wherein the improved class boosting scheme is realized based on the class perception networks. The method solves the problems that update and prediction functions in an original boosting network are too simple and easy to predict or the like, so as to obtain the ciphertext image with higher information entropy.

8 Claims, 5 Drawing Sheets

(56) References Cited

U.S. PATENT DOCUMENTS

| | | | |
|---|---|---|---|
| 8,874,477 B2* | 10/2014 | Hoffberg | G06Q 20/065 |
| | | | 705/37 |
| 9,654,289 B2* | 5/2017 | Vidal Cassanya | H04L 9/0869 |
| 11,562,181 B2* | 1/2023 | Chen | G06F 18/21 |
| 2021/0258778 A1* | 8/2021 | Kim | G06N 3/08 |
| 2022/0019690 A1* | 1/2022 | Cao | G06T 9/00 |

* cited by examiner

IMAGE ENCRYPTION METHOD BASED ON IMPROVED CLASS BOOSTING SCHEME

CROSS-REFERENCE TO RELATED APPLICATIONS

The present application claims the priority of Chinese patent application filed in China Patent Office on Sep. 18, 2021, with the application No. 202111111709.5 and entitled "an image encryption method based on improved class boosting scheme", the entire contents of which are incorporated in the present application by reference.

TECHNICAL FIELD

The present invention relates to the technical field of image encryption, in particular to an image encryption method based on an improved class boosting scheme.

BACKGROUND

With the rapid development of Internet and multimedia technology, it is more and more convenient for people to get information on the Internet. Because images carry private and sensitive information, the security of image information has drawn more attention. The image encryption technology is one of the most effective means to ensure the security of image information. Zhang Yong proposed a unified image encryption system based on a class boosting scheme, which uses class boosting transformation to diffuse image information, thereby realizing image encryption. Although the system has a fast encryption and decryption speed and a good encryption effect, it has the disadvantages that update and prediction functions are too simple: and it is easy for a decoding person to find out a linear relationship, so as to solve it. Therefore, it is positive work to study more complex update and prediction functions to improve the security and reliability of image encryption.

SUMMARY

Aiming at the problem that update and prediction functions in a class boosting scheme in the prior art are too simple, the present invention provides an image encryption method based on the improved class boosting scheme, which combines class perception networks with a class boosting scheme to achieve a better encryption effect.

To achieve the above purpose, the present invention provides an image encryption method based on an improved class boosting scheme, which comprises:
  acquiring parameters of a hyperchaotic system according to plaintext image information;
  generating weights required by class perceptron networks through the plaintext image information;
  bringing the parameters into the hyperchaotic system to obtain chaotic sequences, and shuffling the chaotic sequences by a shuffling algorithm;
  pre-processing the chaotic sequences after shuffling to obtain a sequence required by encryption; and
  bringing a plaintext image and the sequence into an improved class boosting scheme to obtain a ciphertext image, wherein the improved class boosting scheme is realized based on the class perception networks.

Further, wherein acquiring the parameters of the hyperchaotic system according to the plaintext image information specifically comprises: generating a hash value K of the plaintext image by a SHA512 function, converting the hash value K into a binary number, and then generating 128 groups of decimal numbers $H=h_1, h_2, h_3, \ldots, h_{128}$ by 4 hits in each group, and then obtaining a hyperchaotic initial value by the decimal number group H, which is specifically:

$$x_0 = \text{mod}\left(\text{mean}\left(\sum_{i=1}^{32} h_i\right), 1\right)$$

$$x_1 = \text{mod}\left(\text{mean}\left(\sum_{i=33}^{64} h_i\right), 1\right)$$

$$x_2 = \text{mod}\left(\text{mean}\left(\sum_{i=65}^{96} h_i\right), 1\right)$$

$$x_3 = \text{mod}\left(\text{mean}\left(\sum_{i=97}^{128} h_i\right), 1\right).$$

Further, wherein generating the weights required by the class perceptron networks through the plaintext image information specifically comprises: generating initial weights of two class perceptron networks by the decimal number group $H=h_1, h_2, h_3, \ldots, h_{128}$, wherein weights of the class perceptron network PLN-1 are respectively:

$\varphi_{11}=\text{mod}(\text{sum}(h_1 h_2 \ldots h_{32})\times 10^{10}, 9)$ $\varphi_{12}=\text{mod}(\text{sum}(h_{33} h_{34} \ldots h_{64})\times 10^{10}, 9)$ $\varphi_{21}=\text{mod}(\text{sum}(h_{65} h_{66} \ldots h_{96})\times 10^{10}, 9)$ $\varphi_{22}=\text{mod}(\text{sum}(h_{97} h_{98} \ldots h_{128})\times 10^{10}, 9)$; and weights $\varphi'_{11}, \varphi'_{12}, \varphi'_{21}, \varphi'_{22}$ of the perceptron network PLN-2 are respectively:

$\varphi'_{11}=\text{floor}(\text{mean}(h_1 h_2 \ldots h_{32}))$ $\varphi'_{12}=\text{floor}(\text{mean}(h_{33} h_{34} \ldots h_{64}))$ $\varphi'_{21}=\text{floor}(\text{mean}(h_{65} h_{66} \ldots h_{96}))$ $\varphi'_{22}=\text{floor}(\text{mean}(h_{97} h_{98} \ldots h_{128}))$ Further, wherein bringing the parameters into the hyperchaotic system to obtain the chaotic sequences, and shuffling the chaotic sequences by the shuffling algorithm specifically comprise:
  bringing the parameters into the hyperchaotic system to generate four sequences $a_1, a_2, a_3$ and $a_4$ with the length of $M\times N+300$, discarding the first 300 elements of each sequence, and processing the remaining sequences as follows, so as to obtain sequences within a scope of normal plaintext pixel values, namely $(i=1, 2, 3, \ldots, n)$, wherein $b_1(i)=\text{mod}(\text{abs}(\text{floor}(a_1(i)\times 10^{10})), 256)$ $b_2(i)=\text{mod}(\text{abs}(\text{floor}(a_2(i)\times 10^{10})), 256)$ $b_3(i)=\text{mod}(\text{abs}(\text{floor}(a_3(i)\times 10^{10})), 256)$ $b_4(i)=\text{mod}(\text{abs}(\text{floor}(a_4(i)\times 10^{10})), 256)$ generating a random value array $(i=1, 2, 3, \ldots, n)$ used for a Knuth-Durstenfeld shuffling algorithm, wherein NUM is the total sequence length; and $aa_1(i)=\text{mod}(\text{abs}(\text{floor}(a_1(i)\times 10^{10})), \text{NUM}-i+1)+1$ $aa_2(i)=\text{mod}(\text{abs}(\text{floor}(a_2(i)\times 10^{10})), \text{NUM}-i+1)+1$ $$aa_3(i)=\mod(abs(floor(a_3(i)\times10^{10})),NUM-i+1)+1$$

$$aa_4(i)=\mod(abs(floor(a_4(i)\times10^{10})),NUM-i+1)+1$$

shuffling the generated sequences by the shuffling algorithm with the generated random value array.

Further, wherein pre-processing the chaotic sequences after shuffling to obtain the sequence required by encryption specifically comprises: alter shuffling the obtained sequences $b_1$, $b_2$, $b_3$ and $b_4$ with the shuffling algorithm, taking the first numbers in $b_1$, $b_2$, $b_3$ and $b_4$ arrays as a group to sere as the first four numbers in the sequence $\{a_i\}$; taking the second numbers in the $b_1$, $b_2$, $b_3$ and $b_4$ arrays as a group and inserting the numbers into the sequence $\{a_i\}$, repeating the above steps until there are $M\times N/2$ numbers in the sequence $\{a_i\}$, generating the required sequence $\{a_i\}$, where $i=1, 2, 3, \ldots, M\times N/2$, and directly using the sequence for image encryption, wherein M is the number of rows of the plaintext image; and N is the number of columns of the plaintext image.

Further, wherein the improved class boosting scheme comprises a forward transformation module, an overturning transformation module and an inverse transformation module; and operations in the three modules are all based on a $GF(2^8)$ domain.

Further, wherein in the forward transformation module, the plaintext image is first converted into a one-dimensional sequence $\{x_i\}$, where $i=1, 2, 3, \ldots, M\times N$; and then the sequence $\{x_i\}$ is divided into two subsequences $\{e_j\}$ and $\{o_j\}$, where $e_j=x_{2j-1}$; $o_j=x_{2j}$; and $j=1, 2, 3, \ldots L$;

a sequence $\{p_j\}$ is obtained from the subsequence $\{e_j\}$ and the sequence $\{a_i\}$ as follows:

$p_j=e_j+a_i$; where $j=1, 2, 3, \ldots, L$;

after the sequence $\{p_j\}$ as updated by the class perceptron network PLN-1, the sequence is combined with the subsequence $\{o_j\}$ to obtain a sequence $\{d_j\}$ as follows:

$d_j=d_{j-1}+o_j+PLN\text{-}1(p_j,p_{j+1})$, where $j=1, 2, 3, \ldots, L$;

$d_0=0$; and $P_0=0$; and after the sequence $\{s_j\}$ is updated by the class perceptron network PLN-2, the sequence is combined with the sequence $\{p_j\}$ to obtain a sequence $\{s_j\}$ as follows:

$s_j=p_j+p_{j-1}+PLN\text{-}2(d_{j-1},d_j)$, where $j=1, 2, 3, \ldots, L$; and $d_0=0$; and $P_0=0$; and the obtained sequences $\{s_j\}$ and $\{d_j\}$ are combined into a new sequence $\{r_i\}$, where $i=1, 2, 3, \ldots, M\times N$; $R_{2j-1}=S_j$; $R_{2j}=D_j$; and $j=1, 2, 3, \ldots, L$.

Further, wherein in the forward transformation module, the sequence $\{r_i\}$, where $i=1, 2, 3, \ldots, M\times N$, is flipped left and right in the overturning module to obtain a new sequence $\{r'_i\}$, where $i=1, 2, 3, \ldots, M\times N$.

Further, wherein in the forward transformation module, the sequence $\{r'_i\}$ is divided into two different sequences $\{s'_j\}$ and $\{d'_j\}$ according to an odd even index in the inverse transformation module, where $s'_j=r'_{2j-1}$; $d'_j=r'_{2j}$; and $j=1, 2, 3, \ldots L$;

after the sequence $\{d'_j\}$ is updated by the class perceptron network PLN-2, the sequence is combined with the sequence $\{s'_j\}$ to obtain a sequence $\{S'_j\}$ as follows:

$S'_j=s'j-S'_{j-1}-PLN\text{-}2(d'_{j-1},d'_j)$, where $j=1, 2, 3, \ldots L$;

$d'_0=0$; and $S'_0=0$;

after $\{S'_j\}$ is updated by the class perceptron network PLN-1, the sequence is combined with the sequence $\{d'_j\}$ to obtain a sequence $\{o'_j\}$ as follows:

$o'_j=d'_j-d'_{j-1}-PLN\text{-}1(S'_j,S'_{j+1})$, where $j=1, 2, 3, \ldots L$;

$d'_0=0$; and $S'_{L+1}=0$;

a sequence $\{e'_j\}$ obtained from the sequence $\{S'_j\}$ and the sequence $\{a_i\}$ is:

$e'_j=S'_j-a_i$, where $j=1, 2, 3, \ldots L$;

$\{e'_j\}$ and $\{o'_j\}$ are combined into a new sequence $\{y_i\}$, where $i=1, 2, 3, \ldots, M\times N$; $Y_{2j-1}=e'_j$; $Y_{2j}=o'_j$; and $j=1, 2, 3, \ldots L$; and finally, the obtained sequence is converted into a matrix with the size of $M\times N$, that is, an encrypted image is obtained.

According to specific embodiments provided by the present invention, the present invention discloses the following technical effects:

1. Compared with a traditional permutation diffusion structure, the scheme has a faster encryption and decryption speed and has higher information entropy and a better encryption effect when only one round of encryption is needed;
2. Different from an original class boosting scheme, the present invention makes an original linear function become a complex structure combining linear and nonlinear functions by taking class perceptron networks as prediction and update functions of the class boosting scheme. Moreover, parameters of the class perceptron networks are related to a plaintext. Meanwhile, there is a function of self-updating, which can make each operation different, thereby increasing randomness and unpredictability of image encryption, and being of great significance to security of image encryption; and
3. Parameters required by chaotic sequences and the class perception networks are related to a plaintext image, so that the parameters generated by different images are different, thereby greatly improving randomness and security of encryption.

DETAILED DESCRIPTION OF THE EMBODIMENTS

The present invention comprises the following steps: firstly, generating a HASH value of a plait/text image by a HAS512 function, generating parameters required by a hyperchaotic system and weights required by class perceptron networks by the HASH value; secondly, shuffling generated chaotic sequences by a shuffling algorithm; and finally, bringing an obtained random sequence and the plaintext image into an improved class boosting scheme to obtain a final ciphertext image. In the process of decryption, the plaintext image can be recovered without any loss only by bringing the ciphertext image and a key into the improved class boosting scheme.

A chaotic system used in the present invention is a hyperchaotic system.

$$\begin{cases} \dfrac{dx_1}{dt} = m \times (x_2 - x_1) \\ \dfrac{dx_2}{dt} = -x_1 \times x_3 + q \times x_1 + p \times \\ \dfrac{dx_3}{dt} = x_1 \times x_2 - n \times x_3 \\ \dfrac{dx_4}{dt} = x_2 \times x_3 + r \times x_4 \end{cases}$$

where in $$\dfrac{dx_i}{dt},$$

i=1, 2, 3, 4 is a derivative of time t; and m, n, p, q and r are parameters of the chaotic system. When m=35, n=3, p=12, q=7 and r=0.58, the system is called a hyperchaotic system.

A Knuth-Durstenfeld shuffling algorithm used in the present invention comprises the following specific steps:

Step 1: Storing an array with the length of n in an array arr[ ].

Step 2: Generating a random number [1,n], taking the generated random number as an array subscript and outputting as x.

Step 3: Swapping the output x with the last element in the array arr[ ].

Step 4: Generating a random number [1,n−1], taking the generated random number as an array subscript, and outputting as x'.

Step 5: Swapping the output x' with the penultimate element in the array arr[ ].

The above steps are repeated until all n numbers are processed.

Figure 1:
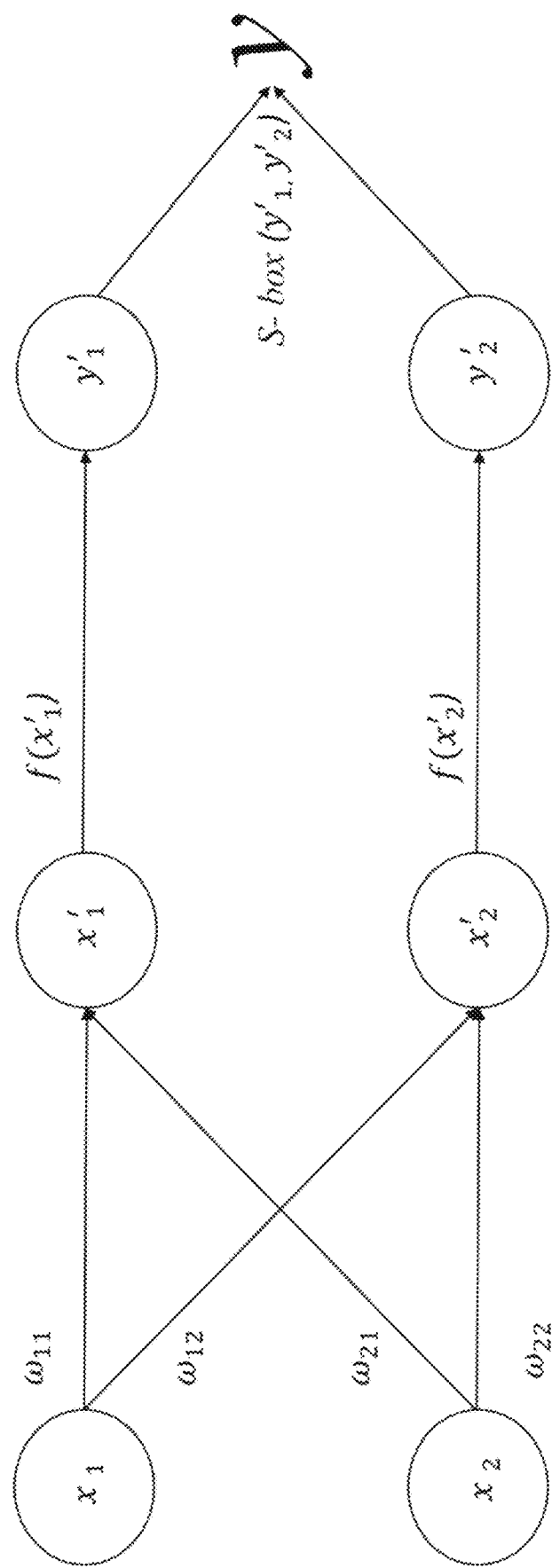
FIG. 1 is a schematic structural diagram of a class perceptron network.
Figure 2:
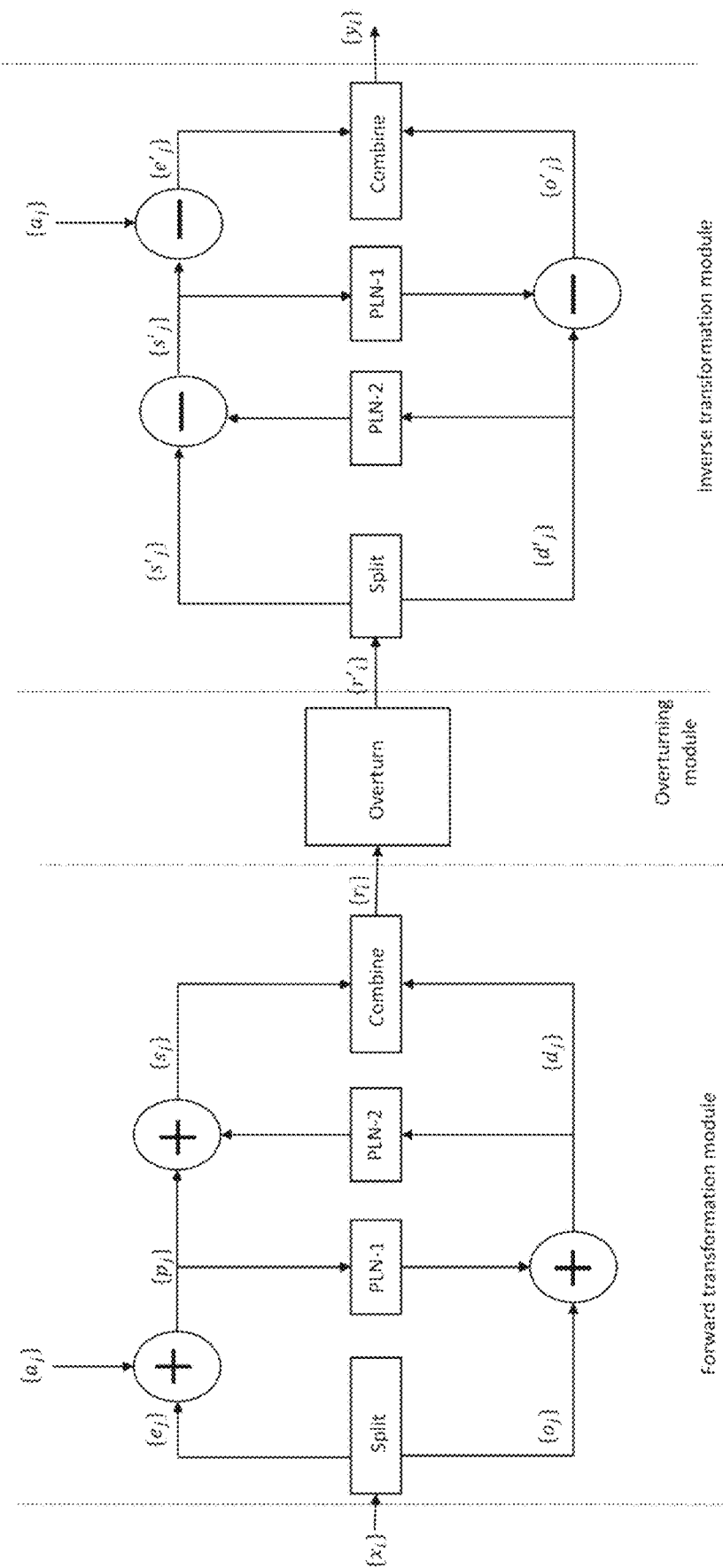
FIG. 2 is a schematic diagram of an improved class boosting scheme.

As shown in FIGS. 1-2, specific steps of an encryption process and weight update of class perceptron networks used in the present invention are as follows:

Step 1: inputting signals $x_1$ and $x_2$ for linear transformation to obtain $x'_1$ and $x'_2$ of a hidden layer:

$$x'_1 = x_1 \times \omega_{11} + x_2 \times \omega_{21}$$

$$x'_2 = x_1 \times \omega_{12} + x_2 \times \omega_{22}$$

Step 2: replacing a weight from the hidden layer to an output layer by a function f(x), wherein an or result of the output layer is as follows.

$$y'_1 = f(x'_1)$$

$$y'_2 = f(x'_2)$$

Where: f(x)=mod(x, 16).

Step 3: calculating an output signal y through S-box.

$$y = S\text{-box}(y'_1, y'_2).$$

Step 4: automatically updating height functions.

$$\omega_{11} = \omega_{11} + \text{mod}(x_1, 2)$$

$$\omega_{12} = \omega_{12} + \text{mod}(x_2, 2)$$

$$\omega_{21} = \omega_{21} + \text{mod}(x_1, 2)$$

$$\omega_{22} = \omega_{22} + \text{mod}(x_2, 2)$$

Initial weights of class perceptron networks are generated by the HASH value.

Embodiment 1

An embodiment of the present invention is implemented based on the technical solution of the present invention. Detailed implementations and specific operation processes are given, but the protection scope of the present invention is not limited to the following embodiment. In the present embodiment, lena256×256 image is used; and a HASH value is generated by a HASH function. After processing, original parameters of a hyperchaotic system are $x_1$=0.37; $x_2$=0.5313; $x_3$=0.1875; and $x_4$=0.2500. Parameters of class perceptron networks are respectively as follows. In PLN-1, $W_{11}$=7; $W_{12}$=7; $W_{21}$=7; and $W_{22}$=6. In PLN-2, $w_{11}$=2; $w_{12}$=7; $w_{21}$=5; and $w_{22}$=2.

Step 1: bringing the original parameters into the hyperchaotic system to generate four sequences $a_1$, $a_2$, $a_3$, and $a_4$ with the length of M×N+300, discarding the first 300 elements of each sequence, and processing the remaining sequences as follows.

$$b_1(i) = \text{mod}(\text{abs}(\text{floor}(a_1(i) \times 10^{10})), 256)$$

$$b_2(i) = \text{mod}(\text{abs}(\text{floor}(a_2(i) \times 10^{10})), 256)$$

$$b_3(i) = \text{mod}(\text{abs}(\text{floor}(a_3(i) \times 10^{10})), 256)$$

$$b_4(i) = \text{mod}(\text{abs}(\text{floor}(a_4(i) \times 10^{10})), 256)$$

Step 2: using the four sequences $a_1$, $a_2$, $a_3$ and $a_4$ to generate random arrays $aa_1$, $aa_2$, $aa_3$ and $aa_4$ used for a shuffling algorithm, and shuffling $b_1$, $b_2$, $b_3$ and $b_4$ by the shuffling algorithm. The algorithm to generate $aa_1$, $aa_2$, $aa_3$ and $aa_4$ are as follows.

$$aa_1(i) = \text{mod}(\text{abs}(\text{floor}(a_1(i) \times 10^{10})), \text{NUM}-i+1)+1$$

$$aa_2(i) = \text{mod}(\text{abs}(\text{floor}(a_2(i) \times 10^{10})), \text{NUM}-i+1)+1$$

$$aa_3(i) = \text{mod}(\text{abs}(\text{floor}(a_3(i) \times 10^{10})), \text{NUM}-i+1)+1$$

$$aa_4(i) = \text{mod}(\text{abs}(\text{floor}(a_4(i) \times 10^{10})), \text{NUM}-i+1)+1$$

Step 3: preprocessing the obtained sequences $b_1$, $b_2$, $b_3$ and $b_4$ with the shuffling algorithm in step 2, taking the first numbers in $b_1$, $b_2$, $b_3$ and $b_4$ arrays as a group to serve as the first four numbers in the sequence $\{a_i\}$; taking the second numbers in the $b_1$, $b_2$, $b_3$ and $b_4$ arrays as a group and inserting the numbers into the sequence $\{a_i\}$, repeating the above steps until there are M×N/2 numbers in the sequence $\{a_i\}$, generating the required sequence $\{a_i\}$, where i=1, 2, 3, . . . , M×N/2, and directly using the sequence for image encryption.

Step 4. Bringing the obtained sequence $\{a_i\}$ together with the plaintext image into the improved class boosting scheme to generate a final ciphertext image.

Figure 3:
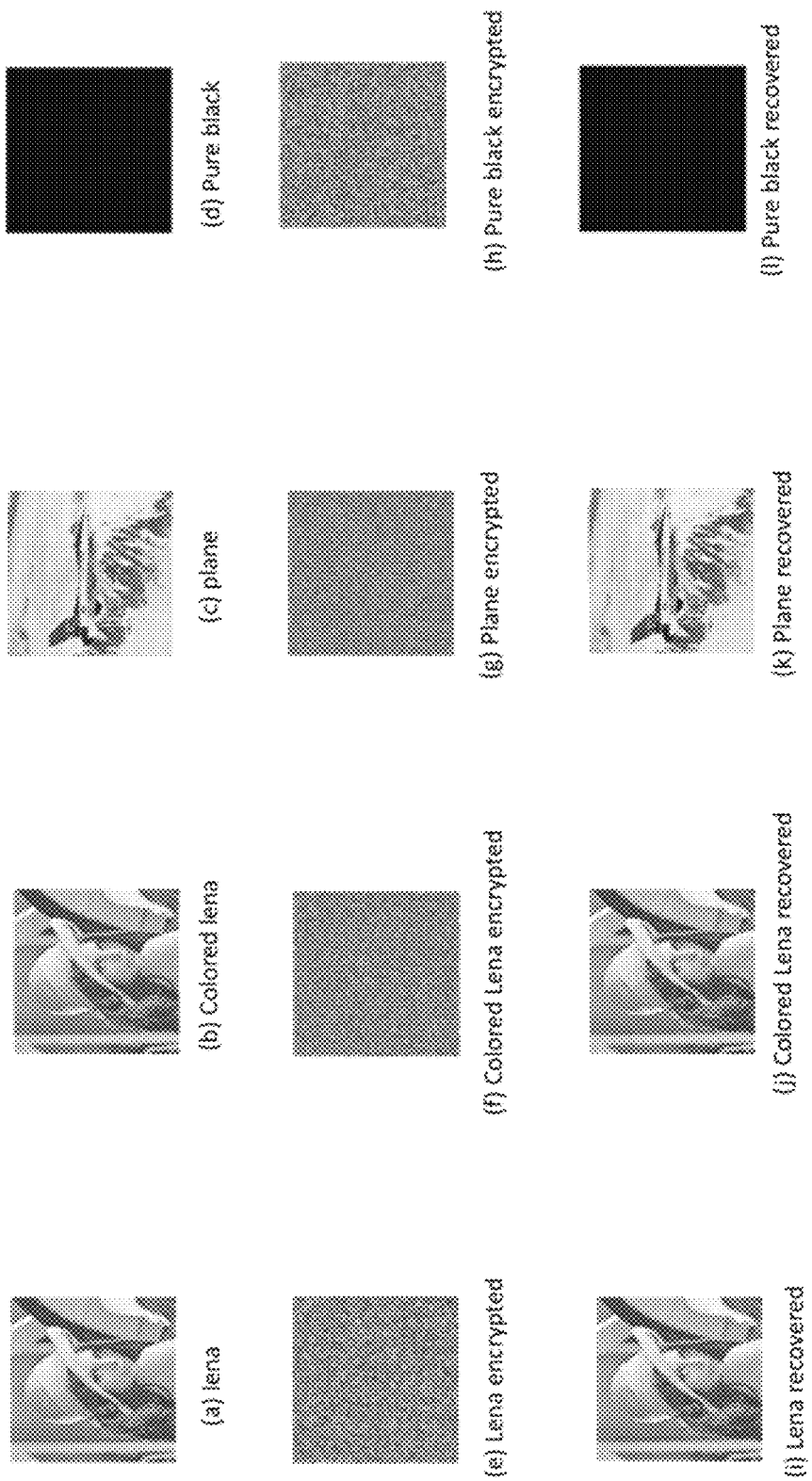
FIG. 3 is a comparison diagram of encryption and decryption using the method of the present invention.
Figure 4:
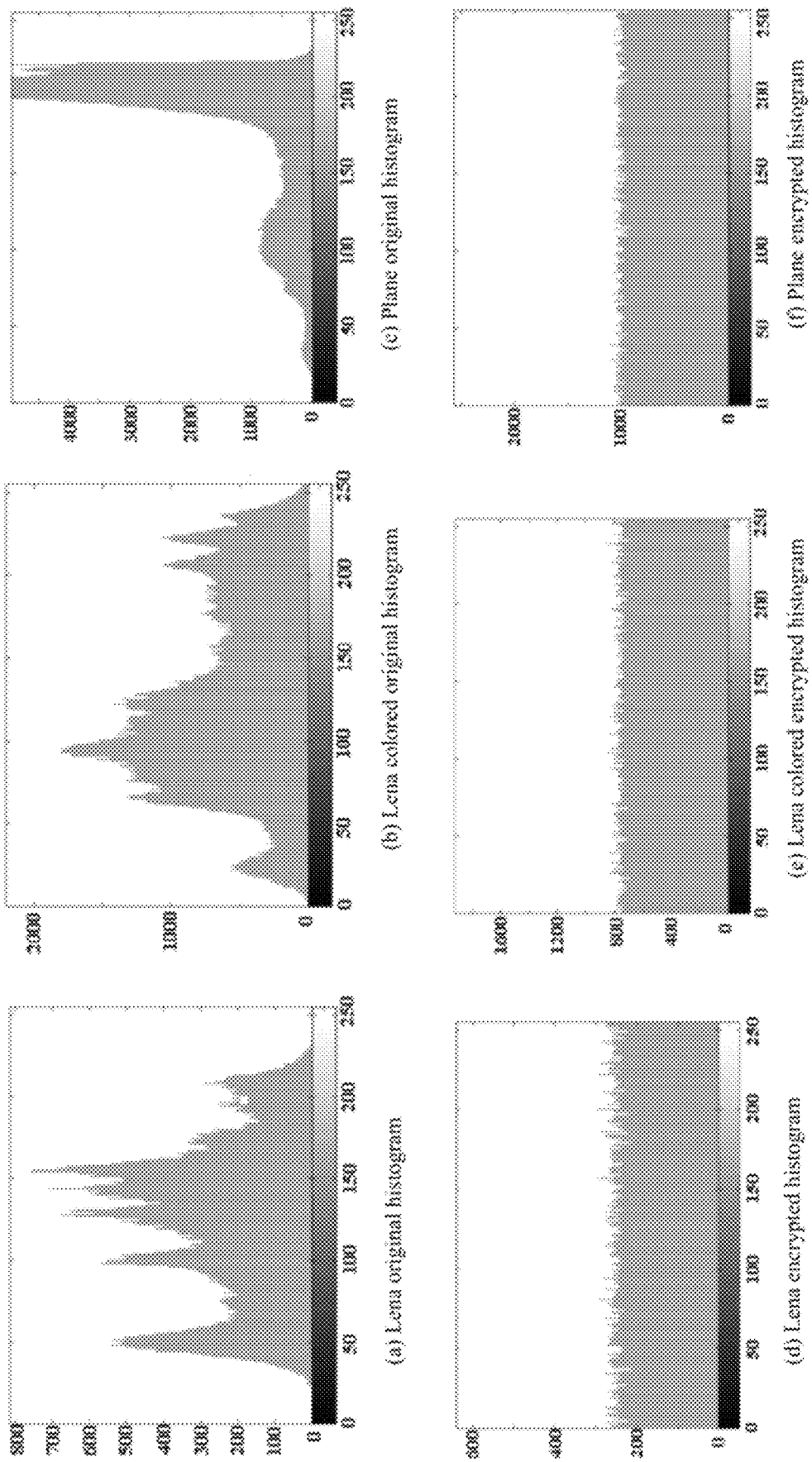
FIG. 4 is an analysis histogram of an embodiment using the method of the present invention.
Figure 5:
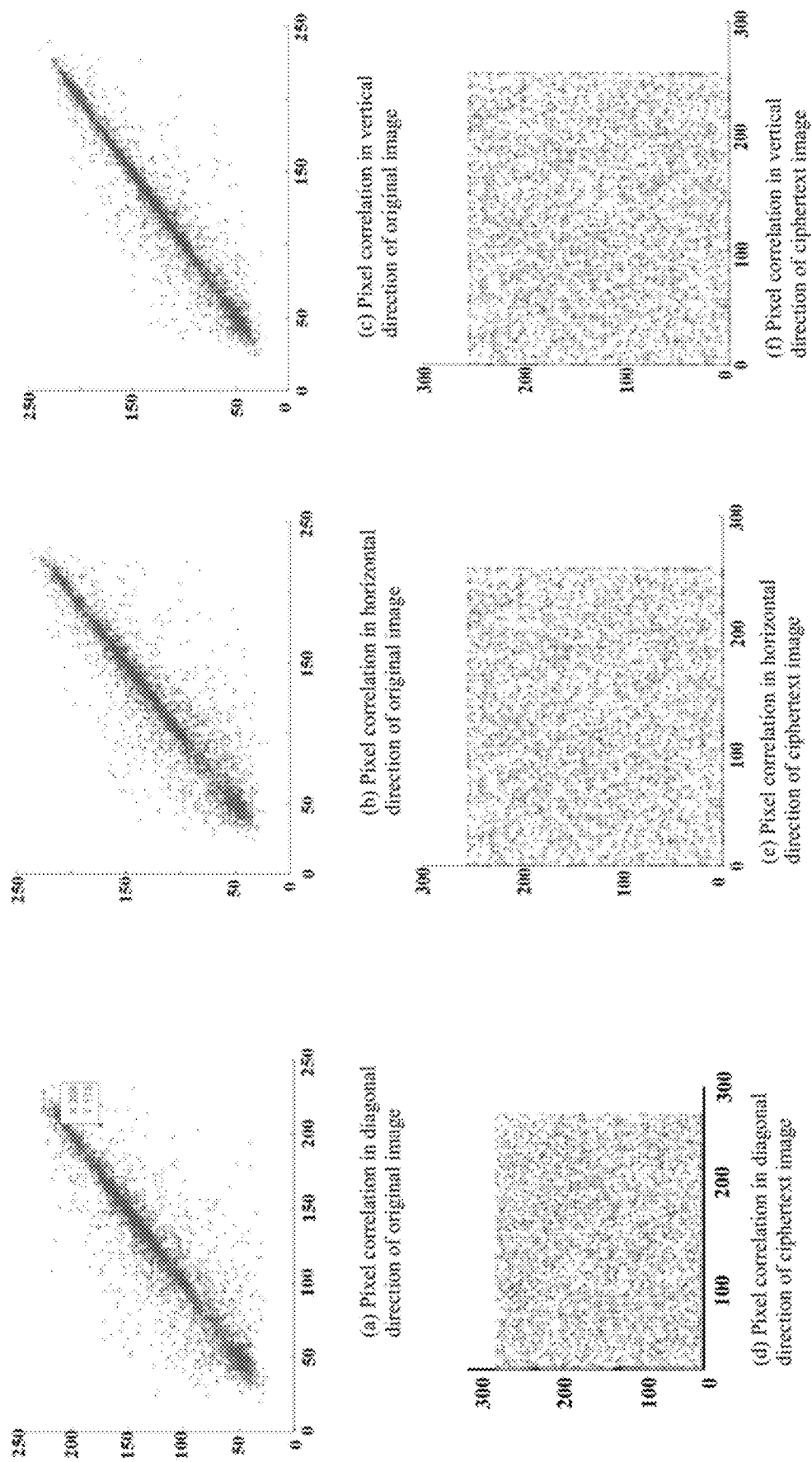
FIG. 5 is a comparison diagram of pixel correlations between a Lena original image and an encrypted image.

The present invention proposes an image encryption method based on an improved class boosting scheme, which greatly enhances unpredictability of the scheme by adding the class perceptron networks into the improved class boosting scheme, and can obtain a better encryption result. The present invention carries out simulation on a computer based on an Intel®Core™i5-9400CPU@2.90 GHz2.90 GHz 64-bit operation system, and an x64 processor; and the programming language used is MATLAB2019b. After the above encryption method is applied to image processing, FIGS. 3-5 show that the present invention has a good encryption effect.

In this paper, specific embodiments are used to explain the principle and implementations of the present invention; and the explanations of the above embodiments are only used to help understand the method and core ideas of the present invention. Meanwhile, according to the idea of the present invention, there will be some changes in the specific implementations and application scope for those ordinarily skilled in the art. To sum up, the contents of the specification should not be understood as limitations to the present invention.

What is claimed is:

1. An image encryption method based on an improved class boosting scheme, comprising:
acquiring parameters of a hyperchaotic system according to plaintext image information;
generating weights required by class perceptron networks through the plaintext image information;
bringing the parameters into the hyperchaotic system to obtain chaotic sequences, and shuffling the chaotic sequences by a shuffling algorithm;
pre-processing the chaotic sequences after shuffling to obtain a sequence required by encryption; and
bringing a plaintext image and the sequence into an improved class boosting scheme to obtain a ciphertext image, wherein the improved class boosting scheme is realized based on the class perceptron networks;
wherein acquiring the parameters of the hyperchaotic system according to the plaintext image information specifically comprises: generating a hash value K of the plaintext image by a SHA512 function, converting the hash value K into a binary number, and then generating 128 groups of decimal numbers $H=h_1, h_2, h_3, \ldots, h_{128}$ by 4 bits in each group, and then obtaining a hyperchaotic initial value by the decimal number group H, which is specifically:

$$x_0 = \mathrm{mod}\left(\mathrm{mean}\left(\sum_{i=1}^{32} h_i\right), 1\right)$$

$$x_1 = \mathrm{mod}\left(\mathrm{mean}\left(\sum_{i=33}^{64} h_i\right), 1\right)$$

$$x_2 = \mathrm{mod}\left(\mathrm{mean}\left(\sum_{i=65}^{96} h_i\right), 1\right)$$

$$x_3 = \mathrm{mod}\left(\mathrm{mean}\left(\sum_{i=97}^{128} h_i\right), 1\right).$$

2. The image encryption method based on the improved class boosting scheme according to claim 1, wherein generating the weights required by the class perceptron networks through the plaintext image information specifically comprises: generating initial weights of two class perceptron networks by the decimal number group $H=h_1, h_2, h_3, \ldots, h_{128}$, wherein weights of the class perceptron network PLN-1 are respectively:

$\varphi_{11}=\mathrm{mod}(\mathrm{sum}(h_1 h_2 \ldots h_{32}) \times 10^{10}, 9)$ $\varphi_{12}=\mathrm{mod}(\mathrm{sum}(h_{33} h_{34} \ldots h_{64}) \times 10^{10}, 9)$ $\varphi_{21}=\mathrm{mod}(\mathrm{sum}(h_{65} h_{66} \ldots h_{96}) \times 10^{10}, 9)$ $\varphi_{22}=\mathrm{mod}(\mathrm{sum}(h_{97} h_{98} \ldots h_{128}) \times 10^{10}, 9)$; and weights $\varphi'_{11}, \varphi'_{12}, \varphi'_{21}, \varphi'_{22}$ of the perceptron network PLN-2 are respectively:

$\varphi'_{11}=\mathrm{floor}(\mathrm{mean}(h_1 h_2 \ldots h_{32}))$ $\varphi'_{12}=\mathrm{floor}(\mathrm{mean}(h_{33} h_{34} \ldots h_{64}))$ $\varphi'_{21}=\mathrm{floor}(\mathrm{mean}(h_{65} h_{66} \ldots h_{96}))$ $\varphi'_{22}=\mathrm{floor}(\mathrm{mean}(h_{97} h_{98} \ldots h_{128}))$ 3. The image encryption method based on the improved class boosting scheme according to claim 1, wherein bringing the parameters into the hyperchaotic system to obtain the chaotic sequences, and shuffling the chaotic sequences by the shuffling algorithm specifically comprise:
bringing the parameters into the hyperchaotic system to generate four sequences $a_1, a_2, a_3$ and $a_4$ with the length of M×N+300, discarding the first 300 elements of each sequence, and processing the remaining sequences as follows, so as to obtain sequences within a scope of normal plaintext pixel values, namely (i=1, 2, 3, ..., n), wherein $b_1(i)=\mathrm{mod}(\mathrm{abs}(\mathrm{floor}(a_1(i) \times 10^{10})), 256)$ $b_2(i)=\mathrm{mod}(\mathrm{abs}(\mathrm{floor}(a_2(i) \times 10^{10})), 256)$ $b_3(i)=\mathrm{mod}(\mathrm{abs}(\mathrm{floor}(a_3(i) \times 10^{10})), 256)$ $b_4(i)=\mathrm{mod}(\mathrm{abs}(\mathrm{floor}(a_4(i) \times 10^{10})), 256)$ generating a random value array (i=1, 2, 3, ..., n) used for a Knuth-Durstenfeld shuffling algorithm, wherein NUM is the total sequence length; and $aa_1(i)=\mathrm{mod}(\mathrm{abs}(\mathrm{floor}(a_1(i) \times 10^{10})), \mathrm{NUM}-i+1)+1$ $aa_2(i)=\mathrm{mod}(\mathrm{abs}(\mathrm{floor}(a_2(i) \times 10^{10})), \mathrm{NUM}-i+1)+1$ $aa_3(i)=\mathrm{mod}(\mathrm{abs}(\mathrm{floor}(a_3(i) \times 10^{10})), \mathrm{NUM}-i+1)+1$ $aa_4(i)=\mathrm{mod}(\mathrm{abs}(\mathrm{floor}(a_4(i) \times 10^{10})), \mathrm{NUM}-i+1)+1$; and shuffling the generated sequences by the shuffling algorithm with the generated random value array.

4. The image encryption method based on the improved class boosting scheme according to claim 1, wherein pre-processing the chaotic sequences after shuffling to obtain the sequence required by encryption specifically comprises: after shuffling the obtained sequences $b_1, b_2, b_3$ and $b_4$ with the shuffling algorithm, taking the first numbers in $b_1, b_2, b_3$ and $b_4$ arrays as a group to serve as the first four numbers in the sequence $\{a_i\}$; taking the second numbers in the $b_1, b_2, b_3$ and $b_4$ arrays as a group and inserting the numbers into the sequence $\{a_i\}$, repeating the above steps until there are M×N/2 numbers in the sequence $\{a_i\}$, generating the required sequence $\{a_i\}$, where i=1, 2, 3, ..., M×N/2, and directly using the sequence for image encryption, wherein M is the number of rows of the plaintext image; and N is the number of columns of the plaintext image.

5. The image encryption method based on the improved class boosting scheme according to claim 1, wherein the improved class boosting scheme comprises a forward transformation module, an overturning transformation module and an inverse transformation module; and operations in the three modules are all based on a $GF(2^8)$ domain.

6. The image encryption method based on the improved class boosting scheme according to claim 5, wherein in the forward transformation module, the plaintext image is first converted into a one-dimensional sequence $\{x_i\}$, where i=1, 2, 3, . . . , M×N; and then the sequence $\{x_i\}$ is divided into two subsequences $\{e_j\}$ and $\{o_j\}$, where $e_j=x_{2j-1}$; $o_j=x_{2j}$; and j=1, 2, 3, . . . , L;

a sequence $\{p_j\}$ is obtained from the subsequence $\{e_j\}$ and the sequence $\{a_i\}$ as follows:

$p_j=e_j+a_j$, where j=1, 2, 3, . . . , L;

after the sequence $\{p_j\}$ is updated by the class perceptron network PLN-1, the sequence is combined with the subsequence $\{o_j\}$ to obtain a sequence $\{di\}$ as follows:

$d_j=d_{j-i}+o_j+PLN\text{-}1(p_j,p_{j+1})$, where j=1, 2, 3, . . . , L;

$d_0=0$; and $p_{L+1}=0$;

after the sequence $\{d_j\}$ is updated by the class perceptron network PLN-2, the sequence is combined with the sequence $\{p_j\}$ to obtain a sequence $\{s_j\}$ as follows:

$s_j=p_j+p_{j-i}+PLN\text{-}2(d_{j-1},d_j)$, where j=1, 2, 3, . . . , L; and $d_0=0$; and $P_0=0$; and the obtained sequences $\{s_j\}$ and $\{d_j\}$ are combined into a new sequence $\{r_i\}$, where i=1, 2, 3, . . . , M×N; $R_{2j-1}=S_j$; $R_{2j}=D_j$; and j=1, 2, 3, . . . , L.

7. The image encryption method based on the improved boosting scheme according to claim 6, wherein in the forward transformation module, the sequence $\{r_i\}$, where i=1, 2, 3, . . . , M×N, is flipped left and right in the overturning module to obtain a new sequence $\{r'_i\}$, where i=1, 2, 3, . . . , M×N.

8. The image encryption method based on the improved boosting scheme according to claim 7, wherein in the forward transformation module, the sequence $\{r'_i\}$ is divided into two different sequences $\{s'_j\}$ and $\{d'_j\}$ according to an odd-even index in the inverse transformation module, where $s'_j=r'_{2j-1}$; $d'_j=r'_{2j}$; and j=1, 2, 3, . . . L;

after the sequence $\{d'_j\}$ is updated by the class perceptron network PLN-2, the sequence is combined with the sequence $\{s'_j\}$ to obtain a sequence $\{S'_j\}$ as follows:

$S'_j=s'_{j-1}-PLN\text{-}2(d'_{j-1},d'_j)$, where j=1, 2, 3, . . . L;

$d'_0=0$; and $S'_0=0$;

after $\{S'_j\}$ is updated by the class perceptron network PLN-1, the sequence is combined with the sequence $\{d'_j\}$ to obtain a sequence $\{o'_j\}$ as follows:

$o'_j=d'_j-d'_{j-1}-PLN\text{-}1(S'_j,S'_{j+1})$, where j=1, 2, 3, . . . L;

$d'_0=0$; and $S'_{L+1}=0$;

a sequence $\{e'_j\}$ obtained from the sequence $\{S'_j\}$ and the sequence $\{a_i\}$ is:

$e'_j=S'_j-a_j$, where j=1, 2, 3, . . . L;

$\{e'_j\}$ and $\{o'_j\}$ are combined into a new sequence $\{y_i\}$, where i=1, 2, 3, . . . , M×N; $Y_{2j-1}=e'_j$; $Y_{2j}=o'_j$; and j=1, 2, 3, . . . L; and finally, the obtained sequence is converted into a matrix with the size of M×N, that is, an encrypted image is obtained.

\* \* \* \* \*